Patented Mar. 10, 1942

Re. 22,046

UNITED STATES PATENT OFFICE 22,046

AZO DYESTUFFS CONTAINING A HEAVY METAL IN COMPLEX FORM

Ernst Fellmer, Leverkusen-I. G.-Werk, Germany, assignor to General Aniline & Film Corporation, a corporation of Delaware No Drawing. Original No. 2,111,559, dated March 22, 1938, Serial No. 753,785, November 25, 1933. Application for reissue November 26, 1940, Serial No. 367,297. In Germany November 25, 1933

8 Claims. (Cl. 260—148)

The present invention relates to new azo dyestuffs containing a heavy metal in a complex form, more particularly it relates to azo dyestuffs which may be represented by the probable general formula:

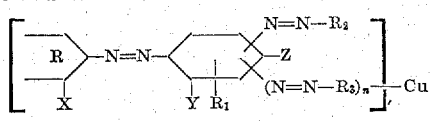

wherein X stands for the hydroxy or carboxylic acid group, Y stands for the hydroxy, the amino or a substituted amino group and Z means the same as Y, wherein R means a radical of the benzene or naphthalene series, $R_1$ stands for hydrogen or alkyl, $R_2$ and $R_3$ stand for radicals of diazotization component of the benzene series free from azo groups suitable for producing azo dyestuffs, and $n$ stands for one of the numbers zero and one.

My new dyestuffs are obtainable by starting with a monoazo dyestuff of the general formula:

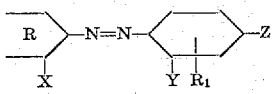

wherein X stands for hydroxyl, alkoxy, halogen or the carboxylic acid group, Y and Z and R and $R_1$ mean the same as stated above, coupling the same with a diazo compound of the benzene series free from azo groups suitable for preparing azo dyestuffs if desired, coupling the diazo dyestuffs with a further diazo compound of the benzene series free from azo groups suitable for preparing azo dyestuffs and transforming the dyestuffs either prior or after the last coupling into the copper complex compounds of the corresponding o-hydroxy- or o-carboxy-azo dyestuffs. It is self-understood that in case there are used as starting compounds such azo dyestuffs of the above-identified second formula, in which X stands for alkoxy or halogen, the conditions of working must be chosen in such a manner that the alkoxy group is split up or the halogen atom is replaced by a hydroxy group in the manufacture of the heavy metal complex compounds.

The new dyestuffs are in form of their alkali metal salts generally dark, watersoluble powders, dyeing leather generally even shades of excellent fastness to light. The dyestuffs can be suitable for dyeing both chromium and vegetable tanned leather. Further my new heavy metal compounds can be suitable for dyeing animal and vegetable fibres.

The invention is illustrated by the following examples, without being limited thereto:

*Example 1.*—20.3 parts by weight of 2-anisidine-4-sulfonic acid are diazotized with 6.9 parts by weight of sodium nitrite and hydrochloric acid at 0° C. The diazotization mixture is then combined with a solution of 11 parts by weight of resorcin in a soda-alkaline medium. The reaction mixture is then rendered weakly acid to acetic acid, 24.9 parts by weight of copper sulfate are added, the reaction mixture is refluxed for several hours, and after cooling, the copper complex compound is salted out, filtered and suspended in water; the aqueous suspension is rendered alkaline, and the copper containing azo dyestuff is coupled in an alkaline medium with a diazo compound from 13.8 parts by weight of o-nitraniline. The dyestuff having in the free state, i. e., in the form of the free acid the following probable formula:

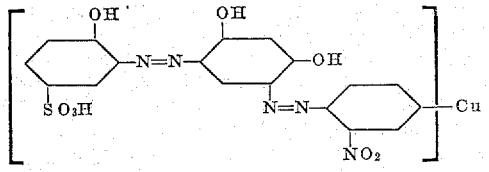

dyes leather, wool and silk a neutral light brown of good fastness properties.

By substituting the o-nitraniline by 4-nitro-1,3-phenylenediamine there is obtained a deeper more yellowish brown. In its free state, the dyestuff corresponds to the following formula:

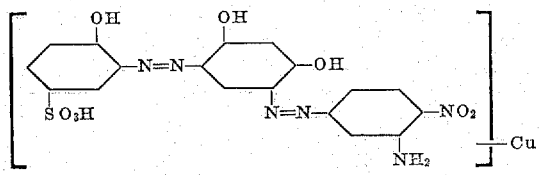

*Example 2.*—The dyestuff prepared by coupling 40.6 parts by weight of diazotized 2-anisidine-4-sulfonic acid with 11 parts by weight of resorcin is transformed into the copper complex compound by heating for several hours at 70° C. with an aqueous copper ammonia solution prepared from 49.8 parts by weight of crystallized copper sulfate. The dyestuff is isolated, in the usual manner; in its free state, i. e., in the form of the free acid it corresponds to the following probable formula:

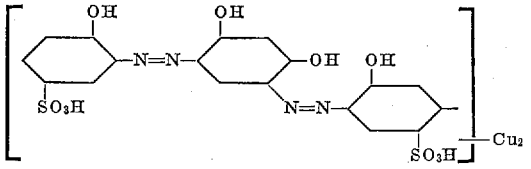

It dyes leather, wool and silk brownish-red shades.

*Example 3.*—The diazo compound from 20.7 parts by weight of 6-chloroaniline-3-sulfonic acid is coupled in an acid medium with 11 parts by weight of resorcin, and when the coupling is complete, the monoazo dyestuff is salted out and filtered. It is then suspended in water and transformed into its copper complex compound by heating for several hours at 90–100° C. with 24.9 parts by weight of crystallized copper sulfate and 80 parts by weight of aqueous caustic soda lye of 30% strength. After cooling, the copper complex compound is isolated from the acidified reaction mixture, suspended in water and coupled in an alkaline medium with the diazo compound from 32.1 parts by weight of dehydrothiotoluidine-sulfonic acid. The dyestuff having in its free state, i. e., in the form of the free acid the following probable formula:

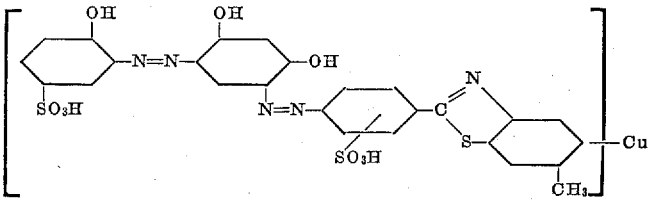

dyes leather neutral middle brown shades.

*Example 4.*—The diazo compound from 24.8 parts by weight of 5-nitro-2-anisidine-4-sulfonic acid is coupled in an acid medium with 11 parts by weight of resorcin, and the monoazo dyestuff formed is refluxed for several hours in an aqueous acetic acid solution containing 24.9 parts of crystallized copper sulfate. The copper complex compound is isolated, coupled in soda-alkaline solution with the diazo compound from 12.7 parts by weight of p-chloroaniline, and the dyestuff is isolated in the usual manner. The dyestuff having in the free state, i. e., in the form of the free acid the following probable formula:

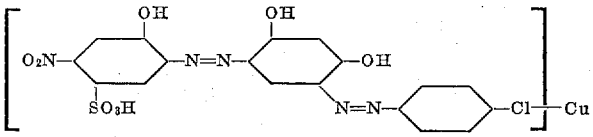

dyes leather, wool and silk middle brown shades.

*Example 5.*—The copper complex compound prepared in accordance with Example 1 from 20.3 parts by weight of 2-anisidine-4-sulfonic acid, 11 parts by weight of resorcin and 15.3 parts by weight of 4-nitrol-1,3-phenylenediamine is coupled in an alkaline medium, favorably in the presence of caustic soda, with a diazo compound prepared from 20.3 parts by weight of 2-anisidine-4-sulfonic acid. The dyestuff having in the free state, i. e., in the form of the free acid the following probable formula:

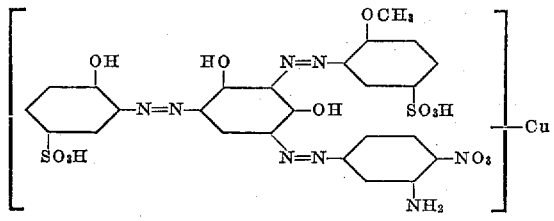

dyes leather yellowish-brown shades.

By substituting the 2-anisidine-4-sulfonic acid used as final component by an equivalent quantity of p-nitraniline-3-sulfonic acid, there is obtained a dyestuff dyeing leather, wool and silk clear yellowish-brown shades.

*Example 6.*—The diazo compound from 40.6 parts by weight of 2-anisidine-4-sulfonic acid is coupled in a soda-alkaline medium with 11 parts by weight of resorcin. The diazo dyestuff obtained is then coupled with a diazo compound prepared from 13.8 parts by weight of diazotized p-nitraniline in a soda-alkaline medium, and the trisazo dyestuff is isolated. It is suspended in water and transformed into the double complex copper compound by heating at 70° C. with a copper ammonia solution prepared from 49.8 parts by weight of crystallized copper sulfate. The dyestuff is isolated by salting out. In its free state, i. e., in the form of the free acid it corresponds to the following probable formula:

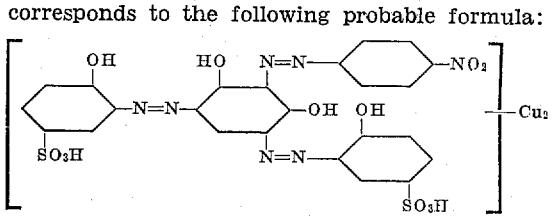

It dyes leather reddish-brown shades.

*Example 7.*—The diazo compound prepared from 20.7 parts by weight of 2-chloroaniline-4-sulfonic acid is coupled in an acid medium with 11 parts by weight of resorcin, and the isolated monoazo dyestuff is transformed into its copper complex compound in the manner described in Example 3. The copper complex compound is isolated, suspended in water and coupled in the presence of sodium acetate with a diazo compound prepared from 13.8 parts by weight of p-nitraniline and then in an alkaline medium in the presence of caustic soda with the diazo compound prepared from 32.1 parts by weight of dehydrothiotoluidine-sulfonic acid. The dyestuff isolated in the usual manner having in the free state, i. e., in the form of the free acid the following probable formula:

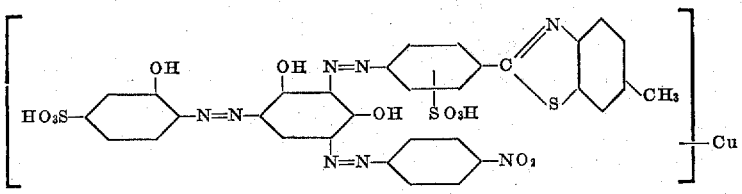

dyes leather middle brown shades.

*Example 8.*—The monoazo dyestuff obtained by coupling in an acid medium the diazo compound from 13.7 parts by weight of anthranilic acid and 10.9 parts by weight of m-aminophenol is heated for 1½ hours at 110° C. in an autoclave with a chromium formate solution corresponding to 8 grams of $Cr_2O_3$. The dyestuff is isolated from the acidified reaction mixture and coupled in an alkaline solution with the diazo compound prepared from 21.8 parts by weight of p-nitraniline-3-sulfonic acid. The dyestuff having in its free state, i. e., in the form of the free acid the following probable formula:

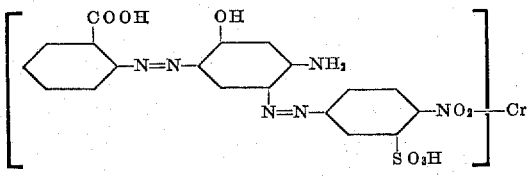

dyes leather yellowish-red light to middle brown shades, wool and silk yellowish-brown shades.

*Example 9.*—The diazo compound prepared from 46.8 parts by weight of 4-nitro-2-aminophenol-6-sulfonic acid is coupled with 10.8 parts by weight of m-phenylenediamine, the coupling mixture being rendered alkaline in order to complete the coupling. The disazo dyestuff is isolated from the acidified solution and transformed into the double chromium complex compound by suspending in water and refluxing for several hours with chromium sulfate solution in a quantity corresponding to 16 parts by weight of $Cr_2O_3$. The chromium complex compound is liberated from the excess chromium sulfate solution or chromium oxide hydrate, respectively, and the reaction mixture is worked up in the usual manner. The dyestuff having in the free state, i. e., in the form of the free acid the following probable formula:

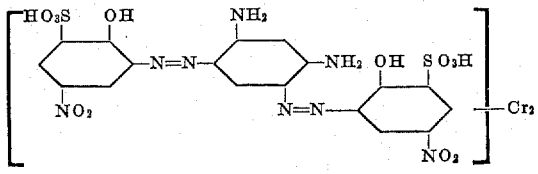

dyes leather, and especially glacé leather, deep blackish-brown shades.

*Example 10.*—The monoazo dyestuff prepared by coupling 22.3 parts by weight of diazotized 6-chloro-2-aminophenol-4-sulfonic acid and 27.7 parts by weight of 2-(p-toluenesulfo)-amino-4-cresol is coupled in a soda alkaline medium with the diazo compound from 17.3 parts by weight of p-sulfanilic acid. The azo dyestuff is salted out with common salt, filtered and transformed into its chromium complex compound by redissolving in water and heating in an autoclave at 105° C. for 1½ hours with chromium sulfate lye corresponding to 9 parts by weight of $Cr_2O_3$. The dyestuff having in its free state, i. e., in the form of the free acid the following probable formula:

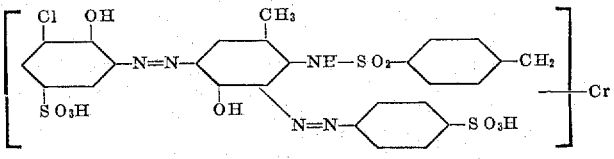

dyes leather yellowish-brown shades.

I claim:

1. Azo dyestuffs containing copper in complex form of the general formula:

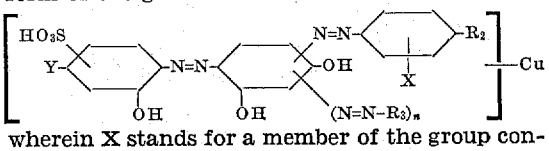

wherein X stands for a member of the group consisting of hydrogen, sulfonic acid, and amino groups, Y stands for a member of the group consisting of hydrogen and $NO_2$, $R_2$ stands for a member of the group consisting of $NO_2$ and a benzthiazole radical, $R_3$ stands for a radical of a diazotization component of the benzene series free from azo groups, and *n* stands for one of the numbers 0 and 1, being in the form of their alkali metal salts generally dark, watersoluble powders, dyeing leather generally even shades of excellent fastness to light.

2. Azo dyestuffs containing copper in complex form of the general formula:

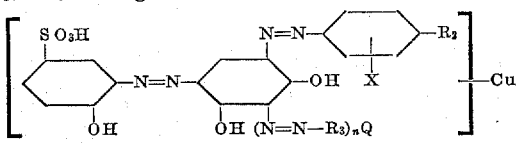

wherein X stands for a member of the group consisting of hydrogen, sulfonic acid and amino groups, $R_2$ stands for a member of the group consisting of the $NO_2$ and a benzthiazole radical, $R_3$ stands for a radical of a diazotization component of the benzene series free from azo groups, and *n* stands for one of the numbers 0 and 1, being in the form of their alkali metal salts generally dark, watersoluble powders, dyeing leather generally even shades of excellent fastness to light.

3. The azo dyestuff having in the form of its free acid the following formula:

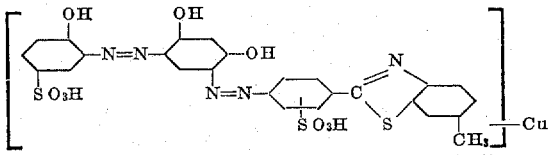

dyeing leather neutral middle brown shades.

4. The azo dyestuff having in its free state the following formula:

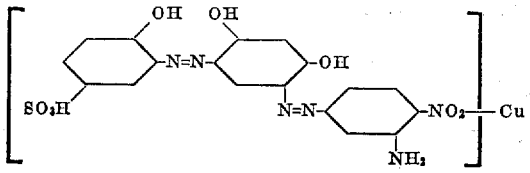

dyeing leather, wool and silk yellowish brown shades of good fastness properties.

5. Complex metal compounds of disazo dyestuffs of the general formula:

$$R—N=N—R_1—N=N—R$$

in which both R's stand for aryl radicals of the benzene and naphthalene series of which at least one contains a lake-forming group, and $R_1$ stands for an aryl radical of the benzene or naphthalene series containing at least two primary amino groups, which complex metal compounds are brown to black colored powders soluble in water and dyeing animal fibers, particularly leather, uniform brown tints of good fastness properties.

6. Complex metal compounds of disazo dyestuffs of the general formula:

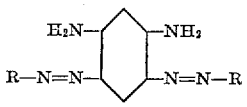

in which both R's stand for aryl radicals of the benzene and naphthalene series, of which at least one contains a lake-forming group, which complex metal compounds are brown to black colored powders soluble in water and dyeing animal fibers, particularly leather, uniform brown tints of good fastness properties.

7. Complex metal compounds of disazo dyestuffs of the general formula:

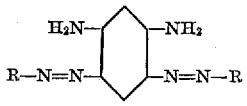

in which both R's stand for phenyl radicals, of which at least one contains a lake-forming group, which complex metal compounds are brown to black colored powders soluble in water and dyeing animal fibers, particularly leather, uniform brown tints of good fastness properties.

8. Complex metal compounds of disazo dyestuffs of the general formula:

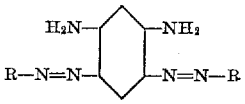

in which both R's stand for phenyl radicals, of which at least one contains a hydroxy group standing in ortho-position to the azo group, which complex metal compounds are brown to black colored powders soluble in water and dyeing animal fibers, particularly leather, uniform brown tints of good fastness properties.

ERNST FELLMER.